United States Patent [19]

Bennett et al.

[11] Patent Number: 5,018,833

[45] Date of Patent: May 28, 1991

[54] NEUTRAL DENSITY FILTERS

[75] Inventors: Keith E. Bennett, Huntington Beach; John R. Staley, III, Corona, both of Calif.

[73] Assignee: Newport Corporation, Fountain Valley, Calif.

[21] Appl. No.: 466,505

[22] Filed: Jan. 17, 1990

[51] Int. Cl.[5] .................... G02B 5/28; B32B 15/04
[52] U.S. Cl. .................. 350/314; 350/313; 350/316
[58] Field of Search .............. 350/313, 314, 316

[56] References Cited

U.S. PATENT DOCUMENTS

| | | | |
|---|---|---|---|
| 3,236,290 | 2/1966 | Lueder | 350/314 |
| 3,649,359 | 3/1972 | Apfel et al. | 350/314 |
| 3,679,291 | 7/1972 | Apfel et al. | 350/314 |
| 3,781,089 | 12/1973 | Fay et al. | 350/314 |
| 3,897,140 | 7/1975 | Tuthill | 350/314 |
| 3,920,533 | 11/1975 | Pompei | 350/311 |
| 3,936,579 | 2/1976 | Ogasawara | 350/164 |

FOREIGN PATENT DOCUMENTS 1087828  8/1960  Fed. Rep. of Germany ...... 350/314

OTHER PUBLICATIONS

"Thin-Film Optical Filters," H. A. MacLeod, (Macmillan Publishing Company, New York, Second Edition, 186), p. 155.
"Absolute Reference Calorimeter for Measuring High Power Laser Pulses," D. L. Franzen and L. B. Schmidt, Applied Optics, vol. 1, Dec. 1976, pp. 3115 to 3117.
"Laser Exposure Testing," Montana Laser Optics (1988).
"Thin-Film Optical Filters," H. A. Macleod, (Macmillan Publishing Company, New York, Second Edition, 186), p. 155.
"Absolute Reference Calorimeter for Measuring High Power Laser Pulses," D. L. Franzen and L. B. Schmidt, Applied Optics, vol. 15, Dec. 1976, pp. 3115 to 3117.
"Laser Exposure Testing," Montana Laser Optics (1988).

Primary Examiner—Nelson Moskowitz
Attorney, Agent, or Firm—Benoit Law Corporation

[57] ABSTRACT

A neutral density filter is made by providing a substrate including a volume absorber having a first density and having an uneven first attenuation characteristic, and providing for a substantially constant attenuation of light by depositing on a backside of the volume absorber a thin-film attenuator having light reflective properties attenuated by the volume attenuator, having a second density and a second attenuation characteristic substantially complementing the first attenuation characteristic to provide the neutral density filter with a substantially constant attenuation at a density substantially equal to the first and second densities. The volume absorber and thin film attenuator are positioned so that incoming light first traverses the volume absorber and then the thin-film attenuator. An antireflection coating may be deposited on a front side of the volume absorber.

20 Claims, 1 Drawing Sheet

NEUTRAL DENSITY FILTERS

FIELD OF THE INVENTION

The subject invention relates to optical attenuators and, more specifically, to neutral density filters and to filtration of visible and invisible light.

BACKGROUND OF THE INVENTION

A neutral density filter is an object the purpose of which is to attenuate incident radiation uniformly independent of wavelength, i.e. neutral with respect to wavelength. Because of its purpose, neutral density filters are often also called attenuators though not all attenuators are neutral. A neutral density filter is characterized by the percent of incident light transmitted or by its optical density (OD). If 10% of light is transmitted (T=0.1), the filter is said to be OD 1. At T=0.01, the filter is OD 2 and at T=0.001 the filter is OD 3.

$$OD = -\log T$$

with $$T = I_O/I_T$$

wherein:

$I_O$ = incident light intensity, and
$I_T$ = transmitted light intensity.

In any discussion of how electromagnetic waves interact with matter, one works with the solutions to Maxwell's equations in dense media. In these discussions various quantities are defined which simplify calculations and descriptions of the interactions. In optics the most commonly used quantity is the index of refraction and it is often a function of wavelength or frequency, temperature and direction.

Bulk absorbers make use of the physical properties of a bulk material or impurities suspended in a bulk material. In both cases, the attenuation of an incident electromagnetic wave can be characterized by an absorption coefficient which governs the exponential decay of the wave as it travels through the material. This coefficient is often derived in terms of a complex index of refraction which is itself a result of more fundamental properties.

In principle, colloidal suspensions, dyes, gels and other materials may qualify as bulk absorbers. However, the most common example of a bulk absorber in visible optics is a colored glass. Glass which normally transmits light with little attenuation is doped with impurities which absorb light through electronic transitions. Once absorbed, the light is re-radiated at longer wavelengths and/or coupled into the glass as heat.

To get a neutral density colored glass, one needs to add a variety of impurities in various concentrations so that the net effect is to develop an absorption coefficient which is uniform with respect to wavelength. Once a mixture is settled on, the density of the filter is modified by making the filter thicker or thinner. Unfortunately as the thickness is varied, the neutrality of the filter varies. Also good mixtures may not be found for certain target values of the absorption coefficient. This is the case with neutral density filters with optical densities of three or higher. The best neutral density colored glasses typically have optical densities equal to or less than one.

A plastic or synthetic material may be used instead of what is commonly referred to as glass. However, the expression "glass" is herein employed, as well as in the accompanying claims, to refer to organic and inorganic glass, plastics or synthetic materials for the volume absorber.

Bulk absorbers typically can handle high optical powers since any power absorbed (and hence heat generated) is distributed over a larger volume of material with typically larger thermal paths so that the optic stays cooler.

Colored glass absorbers also have generally low reflectance. This is useful when working with lasers since a direct reflection with high power can be very dangerous to a person or other pieces of equipment. However, they do not have a constant density over significant wavelengths. All these bulk absorbers are herein referred to as "volume absorbers."

Another class of attenuators are thin-film attenuators. These include multilayer dielectric attenuators and metal layer attenuators.

By making use of the properties of reflection one can through the use of stacks of quarter-wave dielectric layers construct mirrors with high reflectivity, and hence low transmission. Since a layer is a quarter-wave only at one wavelength, broadband dielectric attenuators consist of many stacks of quarter-wave layers of varying thicknesses.

Neutral density filters made from dielectric layers are intrinsically highly reflective. If energy is coupled directly into the layers as absorbed heat, the small thickness would heat so rapidly as to be destroyed since the heat would not be able to flow away from the layer faster than it was being absorbed. However since dielectrics tend to have very small absorption coefficients, multilayer dielectric mirrors are preferred for high power laser application.

The most common uses for multilayer dielectrics are as mirrors and as interference filters, i.e. filters which only let light of a particular wavelength through.

Metals reflect and absorb light due to the light induced movement of electrons within the metal. A metal layer has such a large absorption coefficient that only a very thin layer is needed. In the visible region many metals have varying indexes of refraction and so often designers of metal layer neutral density filters use a mixture of metals as an attenuator. Great success has been met at developing very neutral filters. The most common example is INCONEL, a mixture of three metals, and it is very neutral over wavelengths from 300 to 2000 nanometers. In principle, multiple metal layers may also have some application as neutral density filters, but INCONEL is itself so neutral and cheap as it is a single layer, that there is a question about the advantage of multiple metal layers as stand-alone neutral density filters.

Since metals absorb strongly, metal attenuators have not been useful for high powers, since the heat buildup is so rapid that the metal layer is destroyed. Metal absorbers are thus not volume absorbers.

As pointed out by H. A. Macleod, in Thin-Film Optical Filters (Macmillan Publishing Company, New York, second edition, 1986), p. 155, the overall density of two or more neutral density filters in series is simply the sum of the individual densities, provided that multiple reflections are not permitted to occur between the individual filters. However, this does not address the matter of low-volume absorbers of highly reflective material in series with bulk absorbers.

Reference may also be had to D. L. Franzen and L. B. Schmidt, Absolute Reference Calorimeter for Measuring High Power Laser Pulses, APPLIED OPTICS, Vol. 15, December 1976, pp. 3115 to 3117, and Laser Exposure Testing, MONTANA LASER OPTICS (1988), Table 4.3, Damage Profile for Output Reflectors, and Table 4.9 Damage Profile for Metal Mirrors.

SUMMARY OF THE INVENTION

It is a general object of this invention to overcome the above mentioned drawbacks and to provide neutral density filters which have a substantially constant attenuation characteristic while being able to handle high energy fluences.

In is also an object of this invention to provide composite volume and thin-film attenuators.

Other objects of the invention will become apparent in the further course of this disclosure.

From one aspect thereof, the invention resides in a method of making a neutral density filter, comprising in combination the steps of providing a substrate including a volume absorber having a first density and having an uneven first attenuation characteristic, and having a front side for receiving light to be filtered and a backside, and providing for a substantially constant attenuation of the light by depositing on that backside a thin-film attenuator for light having traversed the volume absorber and having light reflective properties attenuated by the volume attenuator, having a second density and a second attenuation characteristic substantially complementing the first attenuation characteristic to provide the neutral density filter with a substantially constant attenuation at a density substantially equal to the first and second densities.

The subject invention also resides in neutral density filters made by that method.

From a related aspect thereof, the invention resides in a neutral density filter having a substantially constant attenuation at high energy fluences, comprising, in combination, a substrate including a volume absorber having a density lower than the density of that neutral density filter and having a first attenuation characteristic different from said constant attenuation, and a thin-film attenuator forming behind the volume absorber a composite with that volume absorber and having a density substantially equal to the difference between the density of said neutral density filter and the density of the volume absorber, and having a second attenuation characteristic complementing the first attenuation characteristic relative to said constant attenuation. The volume absorber and thin film attenuator are positioned so that incoming light first traverses the volume absorber and then the thin-film attenuator.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

The single

DESCRIPTION OF PREFERRED EMBODIMENTS

Figure 1:
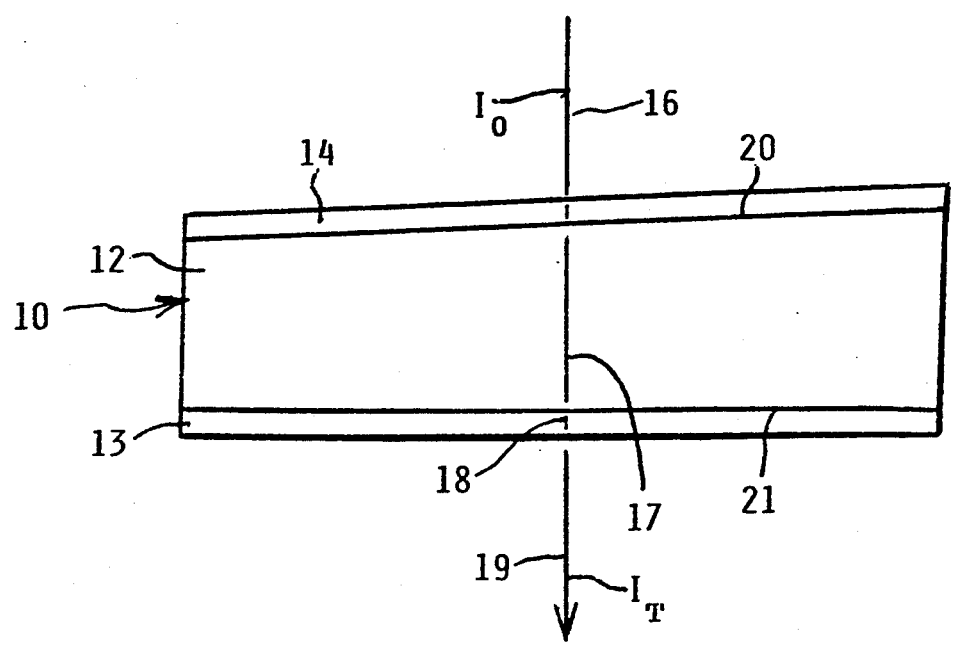
FIG. 1 is a side view of a composite neutral density filter according to a preferred embodiment of the subject invention.

The neutral density composite filter 10 according to the preferred embodiment illustrated in FIG. 1 comprises a volume absorber 12 and a thin film attenuator 13 forming a composite with that volume absorber.

By way of background, the following table is provided, considering a volume absorber per se, a multilayer dielectric absorber per se, a metal layer absorber per se, and a hybrid absorber according to FIG. 1 over the wavelength range 400–1800 nanometers, which for instance, encompasses both the Silicon and Germanium detector responsivity regions. The optical density is called "OD".

| COMPARISON MATRIX OF OD = 3 NEUTRAL DENSITY FILTERS | | | |
|---|---|---|---|
| Filter Type | Pulse Energies | Reflectivity | OD Variation |
| Colored Glass | >40 J/cm$^2$ | 4% | ±0.8 |
| Multilayer Dielectric | 13 J/cm$^2$ | 99% | ±0.1 |
| Metal Layer | 2-5 J/cm$^2$ | 90% | ±0.1 |
| Hybrid | >40 J/cm$^2$ | 5% | ±0.2 |

The average pulse power is pulse energy divided by pulse time. The pulse energies indicated for colored glass and for our hybrid filter are for 30 ns Nd:YAG pulse width. The pulse energies indicated for the multilayer dielectric and for the metal layer are for 15 ns—500 ns Nd:YAG pulse width.

The hybrid filter herein disclosed and listed at the end of this table combines the advantages of a volume absorber with those of a metal layer absorber. By using, for instance, at 12 a neutral density colored glass of OD=1, and adding to it multiple metal layers at 13, we have developed an OD=3 filter which is OD=3+/−0.2 from 400 to 1800 nanometers. The design advantage of multiple metal layers coupled to a colored glass is that neutrality variations in the colored glass can be offset by opposite neutrality variations arising in the metals. A single metal layer such as INCONEL would be a less expensive choice at 13, if the colored glass attenuator at 12 has a more even attenuation than the 0.8 shown in the table.

The composite filter can absorb large powers like a bulk absorber if the initial optic is a volume absorber. That composite filter 10 also has a low reflection, which makes it safer around lasers and the like. The reflection can be reduced to less than one percent by an antireflection coating 14 on the colored glass filter 12.

The subject invention according to the illustrated preferred embodiment provides a neutral density filter 10 having a substantially constant attenuation and comprising, in combination, a volume absorber 12 having a density lower than the density of the hybrid neutral density filter 10 and having a first attenuation characteristic different from constant attenuation, a metal layer or other thin-film attenuator 13 forming a composite with the volume absorber 12 and having a density substantially equal to the difference between the density of the hybrid neutral density filter 10 and the density of the volume absorber 12, and having a second attenuation characteristic complementing said first attenuation characteristic relative to the constant attenuation of the hybrid filter 10. As seen in the drawing, the volume absorber 12 constitutes a substrate for the composite filter 10. That substrate or volume absorber 12 and the thin-film attenuator 13 are positioned so that incoming light 16 first traverses the volume absorber and then the thin-film attenuator.

According to a preferred embodiment of the invention, the volume absorber 12 is a colored glass filter, and the metal layer or other thin-film attenuator 13 is on that colored glass filter, as seen in FIG. 1.

FIG. 1 also illustrates a method of subjecting light 16 to neutral density filtering, comprising in combination the steps of subjecting that light to filtration as shown at 17 by a volume absorber 12 having a first density and having a first attenuation characteristic different from a constant attenuation, and providing a substantially constant attenuation of light by subjecting the light 17 to further filtration as shown at 18 by a metal layer or other thin-film attenuator 13 having light reflective properties reduced by the volume attenuator 12, having a second density and a second attenuation characteristic complementing the first attenuation characteristic to provide a constant attenuation for the neutral density filtering indicated at 19 at a density substantially equal to the sum of the first and second densitities.

The invention also resides in a method of making a neutral density filter 10, comprising in combination the steps of providing a volume absorber 12 having a first density and having an uneven first attenuation characteristic, and having a front side 20 for receiving light to be filtered and a backside 21 opposite that front side. By way of example, a colored glass filter may be provided as volume absorber 12, and may cut to size, such as in terms of diameter or shape. Such volume absorber may be the substrate of the composite filter 10, and is polished to proper thickness for a desired attenuation. As seen in the drawing, a slight wedge may be provided in the volume absorber, such as by having the front side or surface 20 diverge by a few minutes of arc relative to the backside or surface 21. That is, however, entirely optional, but helps in preventing interference effects.

The method according to the subject invention provides for a substantially constant attenuation of light 16 by depositing on the backside 21 a thin-film attenuator 13 for light 17 having traversed the volume absorber, and having light reflective properties attenuated by the volume attenuator 12. The thin-film attenuator is provided with a second density and a second attenuation characteristic substantially complementing the first attenuation characteristic of the volume absorber 12, to provide the neutral density filter 10 with a substantially constant attenuation at a density substantially equal to the first and second densities. Conventional techniques, such as evaporation, sputtering, molecular beam deposit, and the like, may be employed for that purpose. By way of example, a metal layer attenuator is deposited as the thin-film attenuator 13 on the backside 21 of the volume absorber 12. Suitable metals include aluminum, silver, gold, a copper-nickel alloy, and many other metals, metal alloys or multi-metal layers. Alternatively, conventional techniques may be employed to deposit a multilayer dielectric attenuator as the thin-film attenuator 13 on that backside 21 of the colored glass filter or other volume absorber 12. A dielectric mirror may be provided for this purpose.

If desired or necessary, an antireflection coating 14 may be deposited on the front side 20 of the volume absorber 12. Many techniques for depositing antireflection coatings are well known.

We claim:

1. A method of making a neutral density filter, comprising in combination the steps of:
   providing a substrate including a volume absorber having a first density and having an uneven first attenuation characteristic, and having a front side for receiving light to be filtered and a backside opposite said front side; and
   providing for a substantially constant attenuation of said light by depositing on said backside a thin-film attenuator for light having traversed the volume absorber and having light reflective properties attenuated by said volume attenuator, and having a second density and a second attenuation characteristic substantially complementing said first attenuation characteristic to provide said neutral density filter with a substantially constant attenuation at a density substantially equal to said first and second densities.

2. A method as in claim 1, including the step of:
   depositing an antireflection coating on said front side.

3. A method as in claim 1, including the step of:
   depositing a metal layer attenuator as said thin-film attenuator on said backside of the volume absorber.

4. A method as in claim 1, including the step of:
   depositing a multilayer dielectric attenuator as said thin-film attenuator on said backside of the volume absorber.

5. A method as in claim 1, including the step of:
   providing a colored glass filter as said volume absorber.

6. A method as in claim 5, including the step of:
   depositing a metal layer attenuator as said thin-film attenuator on a backside of said colored glass filter.

7. A method as in claim 5, including the step of:
   depositing a multilayer dielectric attenuator as said thin-film attenuator on a backside of said colored glass filter.

8. A neutral density filter made by a method comprising in combination the steps of:
   providing a substrate including a volume absorber having a first density and having an uneven first attenuation characteristic, and having a front side for receiving light to be filtered and a backside opposite said front side; and
   providing for a substantially constant attenuation of said light by depositing on said backside a thin-film attenuator for light having traversed the volume absorber and having light reflective properties attenuated by said volume attenuator, and having a second density and a second attenuator characteristic substantially complementing said first attenuation characteristic to provide said neutral density filter with a substantially constant attenuation at a density substantially equal to said first and second densities.

9. A neutral density filter as in claim 8, wherein said method includes the step of:
   depositing an antireflection coating on said front side.

10. A neutral density filter as in claim 8, wherein said method includes the step of:
    depositing a metal layer attenuator as said thin-film attenuator on said backside of the volume absorber.

11. A neutral density filter as in claim 8, wherein said method includes the step of:
    depositing a multilayer dielectric attenuator as said thin-film attenuator on said backside of the volume absorber.

12. A neutral density filter as in claim 8, wherein said method includes the step of:
    providing a colored glass filter as said volume absorber.

13. A neutral density filter as in claim 12, wherein said method includes the step of:
   depositing a metal layer attenuator as said thin-film attenuator on a backside of said colored glass filter.

14. A neutral density filter as in claim 12, wherein said method includes the step of:
   depositing a multilayer dielectric attenuator as said thin-film attenuator on a backside of said colored glass filter.

15. A neutral density filter having a substantially constant attenuation, comprising in combination:
   a substrate including a volume absorber having a density lower than the density of said neutral density filter and having a first attenuation characteristic different from said constant attenuation; and
   a thin-film attenuator forming behind said volume absorber a composite with said volume absorber and having a density substantially equal to the difference between the density of said neutral density filter and the density of said volume absorber, and having a second attenuation characteristic complementing said first attenuation characteristic relative to said constant attenuation wherein the volume absorber and thin-film attenuator are positioned so that incoming light first traverses the volume absorber and then the thin-film attenuator.

16. A neutral density filter as in claim 15, wherein:
   said volume absorber is a colored glass filter; and
   said thin-film attenuator is on said colored glass filter.

17. A neutral density filter as in claim 16, including:
   an antireflection coating on said colored glass filter.

18. A neutral density filter as in claim 15, wherein:
   said thin-film attenuator is a metal layer attenuator.

19. A neutral density filter as in claim 15, wherein:
   said thin-film attenuator is a single metal layer.

20. A neutral density filter as in claim 15, wherein:
   said thin-film attenuator is a multilayer dielectric attenuator.

* * * * *